US008713643B2

United States Patent
Rasmusson et al.

(10) Patent No.: US 8,713,643 B2
(45) Date of Patent: Apr. 29, 2014

(54) METHOD AND DEVICES FOR HANDLING ACCESS PRIVILEGES

(75) Inventors: Martin Rasmusson, Malmö (SE); John Rehn, Malmö (SE); Mattias Kindborg, Malmö (SE); Sebastian Hultqvist, Malmö (SE)

(73) Assignee: Axis AB, Lund (SE)

( * ) Notice: Subject to any disclaimer, the term of this patent is extended or adjusted under 35 U.S.C. 154(b) by 1028 days.

(21) Appl. No.: 12/353,036

(22) Filed: Jan. 13, 2009

(65) Prior Publication Data

US 2009/0183238 A1 Jul. 16, 2009

Related U.S. Application Data

(60) Provisional application No. 61/021,927, filed on Jan. 18, 2008.

(30) Foreign Application Priority Data

Jan. 15, 2008 (EP) .................................... 08150277

(51) Int. Cl.
*G06F 7/04* (2006.01)
*G06F 21/00* (2013.01)

(52) U.S. Cl.
USPC .............................................. 726/4; 713/182

(58) Field of Classification Search
USPC .............................................. 726/4; 713/182
See application file for complete search history.

(56) References Cited

U.S. PATENT DOCUMENTS

| | | | |
|---|---|---|---|
| 6,067,624 A | 5/2000 | Kuno | |
| 6,208,379 B1 | 3/2001 | Oya et al. | |
| 6,449,643 B1 | 9/2002 | Hyndman et al. | |
| 8,024,813 B2 * | 9/2011 | Hong et al. | 726/28 |
| 2002/0162005 A1 * | 10/2002 | Ueda et al. | 713/182 |
| 2003/0093430 A1 | 5/2003 | Mottur | |
| 2004/0167989 A1 * | 8/2004 | Kline et al. | 709/245 |
| 2005/0021360 A1 * | 1/2005 | Miller et al. | 705/1 |
| 2005/0097353 A1 | 5/2005 | Patrick et al. | |
| 2006/0130150 A1 * | 6/2006 | Garza-Gonzalez et al. | 726/28 |
| 2006/0136991 A1 * | 6/2006 | Kern | 726/2 |
| 2006/0242254 A1 | 10/2006 | Okazaki et al. | |
| 2006/0259980 A1 * | 11/2006 | Field et al. | 726/27 |
| 2007/0237169 A1 * | 10/2007 | Trainin et al. | 370/458 |
| 2008/0072292 A1 * | 3/2008 | Narjala | 726/4 |
| 2008/0083040 A1 * | 4/2008 | Dani et al. | 726/28 |

FOREIGN PATENT DOCUMENTS

| | | |
|---|---|---|
| JP | H10-161213 | 6/1998 |
| WO | 2007/069207 | 6/2007 |

* cited by examiner

*Primary Examiner* — Techane Gergiso
(74) *Attorney, Agent, or Firm* — Volpe and Koenig, P.C.

(57) ABSTRACT

A method and apparatus are disclosed for configuring access privileges in a system of networked devices. A plurality of access identities is selected and information of access privileges of each of the selected access identities to accessible functions of networked devices is retrieved. The access privileges of the selected access identities for each one of said accessible function of each one of said networked devices is accumulated. The accumulated access privileges are presented for each one of said accessible function of each one of said networked devices in an interface allowing editing of the accumulated access privileges. Change in accumulated access privileges to a specific function in a specific networked device is indicated, and the specific function of the specific networked device is configured for allowing access by the selected users in accordance with the indicated change of accumulated access privileges.

22 Claims, 8 Drawing Sheets

| ND | FUNCTIONS | | | |
|---|---|---|---|---|
| | FNC1 | FNC2 | FNC3 | FNC4 |
| ND1 | TRUE | FALSE | NULL | NULL |
| ND2 | TRUE | TRUE | TRUE | --- |

FIG 4

| ND | FUNCTIONS | | | | | | | |
|---|---|---|---|---|---|---|---|---|
| | FNC1 | | FNC2 | | FNC3 | | FNC4 | |
| ND1 | TRUE | 0 | TRUE | 1 | TRUE | 1 | NULL | 0 |
| ND2 | TRUE | 0 | FALSE | 1 | TRUE | 0 | --- | 0 |

FIG 6

INFORMATION MESSAGE

| ND | FUNCTIONS | | | | | | |
|---|---|---|---|---|---|---|---|
| | FNC1 | FNC2 | FNC3 | FNC4 | FNC5 | FNC6 | FNC6 |
| ND1 | TRUE | FALSE | NULL | --- | --- | --- | --- |
| ND2 | TRUE | TRUE | TRUE | --- | --- | --- | --- |
| ND3 | FALSE | FALSE | FALSE | --- | --- | --- | --- |
| ND4 | NULL | TRUE | FALSE | --- | --- | --- | --- |
| ND5 | TRUE | NULL | TRUE | NULL | TRUE | FALSE | TRUE |
| ND6 | FALSE | TRUE | TRUE | --- | --- | --- | --- |
| ND7 | NULL | NULL | FALSE | --- | --- | --- | --- |
| ND8 | TRUE | TRUE | TRUE | NULL | --- | --- | --- |
| ND9 | TRUE | FALSE | FALSE | --- | --- | --- | --- |
| ND10 | NULL | TRUE | NULL | --- | --- | --- | --- |
| ND11 | FALSE | NULL | TRUE | --- | --- | --- | --- |

| ID OF SELECTED USERS |
|---|
| AI1 |
| AI2 |
| AI3 |
| AI4 |
| AI5 |
| AI6 |
| AI7 |
| AI8 |

| USER MANAGEMENT | | | | X |
|---|---|---|---|---|
| | | | SEARCH... | |
| TYPE | NAME | DOMAIN | DETAILS | ROLE |
| USER | NILSN | SURVNET | NILS NILSSON | OPERATOR |
| USER | MIKEM | PCNET | MIKE MATSON | ADMINISTR |
| GROUP | OPERATORS_A | SURVNET | OFFICE A OPS | VIEWER |

[SELECT]                                              [CLOSE]

FIG 8

ACCESS PRIVILEGES                                          X

CAMERAS (120)    I/O (122)

| NAME | ☐ACCESS | ☐AUDIO OUT | ☐AUDIO IN | ☐PTZ |
|---|---|---|---|---|
| ROOM CAM 1 | ☒ | ☒ | ☐ | ☒ |
| ROOM CAM 2 | ☐ | ☐ | ☒ | ☒ |
| ENTRANCE N | ☒ | | | ☐ |
| ENTRANCE S | ☐ | ☒ | ☐ | ☐ |
| GARAGE | ☒ | ☒ | | ☐ |
| HALLWAY | ☒ | ☒ | | ☒ |

[OK]   [CANCEL]

METHOD AND DEVICES FOR HANDLING ACCESS PRIVILEGES

CROSS REFERENCE TO RELATED APPLICATIONS

This application claims the benefit of U.S. provisional application no. 61/021,927 filed on Jan. 18, 2008, and European application no. 08150277.5 filed on Jan. 15, 2008, which are incorporated by reference as if fully set forth.

TECHNICAL FIELD OF THE INVENTION

A method and devices for configuring access privileges to networked devices in a network system are disclosed.

BACKGROUND OF THE INVENTION

It is becoming more and more common to make various types of devices and their functions accessible by connecting the devices to computer networks. However, in most cases the owner of the devices or the network is not interested in letting every one having access to the network have access to the devices and their functionality. In order to solve this problem the system may be arranged to provide users with specific access privileges. These access privileges may for instance be that the user is allowed to access the video from a surveillance camera A, but not access a pan tilt control for controlling the viewing direction of the same camera.

Moreover, access privileges schemes are often implemented in security systems, e.g. surveillance systems, burglary protections, access control systems, fire alarm systems, etc. When systems are used for such critical functions, a scheme for access privileges becomes very important.

Most systems implementing schemes for handling access privileges allow a system administrator to set the access privileges of each user individually for each camera. However, the managing of such a system quickly becomes complicated and burdensome to manage as the number of users and devices increases. In some systems access level groups or user groups are introduced in order to facilitate the managing. In those cases, the managing is facilitated by the fact that you only have to manage the access privileges of each group.

In U.S. Pat. No. 6,208,379, Oya et al., some methods for managing access privileges are described. One method described in U.S. Pat. No. 6,208,379 for facilitating the managing of access privileges is to bundle users into user groups as described above. Generally, U.S. Pat. No. 6,208,379 describes setting access privileges for a user group by selecting a camera from a camera list, indicating in a dialog box which is opened upon selection of the camera that access privilege settings is requested. Then an access control panel or dialog box of the camera is presented. In the access control panel, it is possible to select a predefined access mode. By changing the access mode of the camera, predefined access privileges for all the user groups are set in the system. In order to set the access privileges at a more detailed level, an access privilege window is opened from the access control panel. The access privilege window then presents a matrix indicating the access privileges of each user group relating to each function of the selected camera.

The methods disclosed in U.S. Pat. No. 6,208,379 are cumbersome to process, particularly when access privileges to a plurality of different cameras are to be set. Moreover, the methods do not give the administrator of the access privileges many alternatives especially when it comes to customizing the access privileges for different users.

SUMMARY OF THE INVENTION

One object of the invention is to facilitate setting of access privileges for a plurality of network devices and facilitate the customization of the access privileges.

In particular, according to one aspect of the invention, a method for configuring access privileges in a system of networked devices comprises selecting a plurality access identities, retrieving information of access privileges of each of the selected access identities to accessible functions of networked devices, accumulating the access privileges of the selected access identities for each one of said accessible function of each one of said networked devices, presenting said accumulated access privileges for each one of said accessible function of each one of said networked devices in an interface allowing editing of the accumulated access privileges, indicating a change in accumulated access privileges to a specific function in a specific networked device, and configuring the specific function of the specific networked device for allowing access by the selected users in accordance with the indicated change of accumulated access privileges.

In accordance with this method, changing access privileges are facilitated, particularly in regards to changing access privileges in cases where the access privileges of users are not already related to each other in the system, and where access privileges regarding a plurality of devices are to be changed. By performing the act of accumulating the access privileges as described above, such an operation of changing access privileges becomes possible.

According to one embodiment, said accumulating the access privileges includes counting the number of selected access identities having access privileges to each one of said functions of each one of said networked devices. The advantage of this is that it is an uncomplicated way of achieving an accumulator value, or in other terms to achieve a value representing the access privileges of a plurality of individual users who do not have to have identical access privileges.

According to a further embodiment, the previous mentioned accumulating step may be extended by setting the accumulated access privilege for a specific function of a networked device to a value indicating that all selected access identities are allowed access to the specific function if said counting indicates that all selected users are allowed access to the specific function, setting the accumulated access privilege for a specific function of a networked device to a value indicating that none of the selected access identities are allowed access to the specific function if said counting indicates that none of the selected access identities are allowed access to the specific function, and setting the accumulated access privilege for a specific function of a networked device to a value indicating that some of the selected access identities are allowed access to the function if said counting indicates that some of the selected access identities are allowed access to the function. Thus is facilitated the management of the access privileges of the selected users as the person managing the access privileges by changing access privileges may be given a quick overview of the present status by means of these three states.

According to yet another embodiment, the method further comprises sending via a computer network information representing said accessible functions of said networked devices, information representing the accumulated access privilege associated with each one of these functions, and information enabling identification of the selected access identities, to a client computer performing said presenting. This is advantageous in that the processing related to indicating the changes of the access privileges becomes decentralized, i.e. there is no need for the access server to "remember" or store information relating to a request from a client. Hence, the processing at the access server may be simplified and require less processing and memory capacity.

According to one embodiment, said information enabling identification of the selected access identities is a list including identifiers of the selected access identities.

According to another embodiment, said information enabling identification of the selected access identities is an identifier identifying the location of a list including identifiers of the selected access identities.

In yet another embodiment, the method further comprises returning, via the computer network, information representing each one of said accessible functions of each one of said networked devices, accumulated access privilege associated with each of these functions, and information enabling identification of the selected access identities, wherein the accumulated access privilege associated with at least one function of a networked device has been changed in relation to the corresponding information previously sent via the computer network.

According to one embodiment, the at least one function of a networked device for which the accumulated access privilege has been changed is tagged in order to indicate that the accumulated access privilege to this particular function has been changed in relation to the corresponding information previously sent via the computer network. The advantage of this is that an operation of configuring the access privileges of the system in accordance with the changed accumulated access privileges from the client may be easily extracted from the information relating to non changed access privileges. Hence, such a scheme may save processing power and time.

In another embodiment, said act of indicating a change in accumulated access privileges to a specific function in a specific network device only enables changing an access privilege of a specific function of a specific network device to either allowing all users identified by the selected access identities to access the specific function or allowing none of the selected users to access the specific function.

According to another embodiment, the selecting of a plurality of access identities include selecting a plurality of access identities from access identities registered for using the system.

In a further embodiment, the selecting of access identities includes selecting individual users.

In yet a further embodiment, the selecting of access identities includes selecting user groups.

According to another aspect of the invention, a server for handling access privileges in a system of networked devices comprises an access privileges manager arranged to retrieve information of access privileges of individually selected access identities to accessible functions associated with networked devices, and arranged to generate a message including accumulated access privileges in view of the selected access identities for said functions of the networked devices. An access privileges accumulator is arranged to accumulate the access privileges of the selected access identities for said accessible functions of the networked devices from said retrieved information. An access privileges configurator is arranged to configure the access privileges of accessible functions of networked devices for the selected access identities in accordance with a received message including an indicator indicating that the access privileges of said function of the networked device is to be changed.

A server having this configuration makes it possible to facilitate operations of changing access privileges for individual users and a plurality of network devices. This may be particularly true for operations where the access privileges of unrelated users to a plurality of devices are to be changed. By accumulating the access privileges as described above, such an operation of changing access privileges is enabled.

According to one embodiment, said access privileges accumulator is arranged to accumulate the access privileges by counting the number of selected access identities having access privileges to each one of said accessible functions of the networked devices.

The advantage of this is that it is a non complicated way of achieving an accumulator value, or in other terms to achieve a value representing the access privileges of a plurality of individual users who do not have to have identical access privileges.

According to a further embodiment, the access privileges accumulator further is arranged to set the accumulated access privilege for a specific function of a networked device to a value indicating that all selected access identities are allowed access to the specific function if said counting indicates that all selected users are allowed access to the specific function, set the accumulated access privilege for a specific function of a networked device to a value indicating that none of the selected access identities are allowed access to the specific function if said counting indicates that none of the selected access identities are allowed access to the specific function, and set the accumulated access privilege for a specific function of a networked device to a value indicating that some of the selected access identities are allowed access to the function if said counting indicates that some of the selected access identities are allowed access to the function.

This access privileges accumulator facilitates the management of the access privileges of the selected users as the person managing the access privileges by changing access privileges may be given a quick overview of the present status by means of these three states.

According to another embodiment, the access privileges manager is arranged to include, in said generated message, information representing accessible functions of the networked devices, the accumulated access privilege associated with each included function, and information enabling identification of the selected access identities.

According to yet another embodiment, the system is a monitoring system.

In another embodiment, the access identities include a user identity and in a further embodiment, the access identities include a user group identity.

According to yet another aspect of the invention, a client for changing access privileges to functions of networked devices of a system comprises a display, an input, component for selecting access identities, said component being arranged to present access identities on the display and to allow a user of the client to select access identities by the input, and component for changing access privileges for selected access identities to accessible functions of networked devices, said component being arranged to present accumulated access privileges relating to said accessible functions of the networked devices on the display, to allow a user of the client to select and change the accumulated access privileges for presented functions, and to generate a message including information of changed accumulated access privileges.

This client may present the advantage of facilitating change of access privileges to a plurality of networked devices and for customizing access privileges for the users.

According to one embodiment, the component for changing access privileges is arranged to receive a message via a network interface, said message includes information representing accessible functions of networked devices, information representing the accumulated access privileges associated with each of these functions, and information enabling identification of the selected access identities.

According to another embodiment, said generated message includes information representing accessible functions of networked devices, information representing the accumulated access privileges associated with each of these functions, an indicator indicating each accumulated access privileges that has been changed, and information enabling identification of the selected access identities.

According to yet another embodiment, the information enabling identification of the selected access identities is a list including identifiers of the selected access identities.

According to a further embodiment, the information enabling identification of the selected access identities is an identifier identifying the location of a list including identifiers of the selected users.

In the context of the present application, a networked device should be understood as a device including circuitry for enabling sending and receiving signals and/or messages over a computer network and wherein the device is arranged to send data or information resulting from the functionality of the device over the computer network.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF THE EMBODIMENTS

Figure 1:
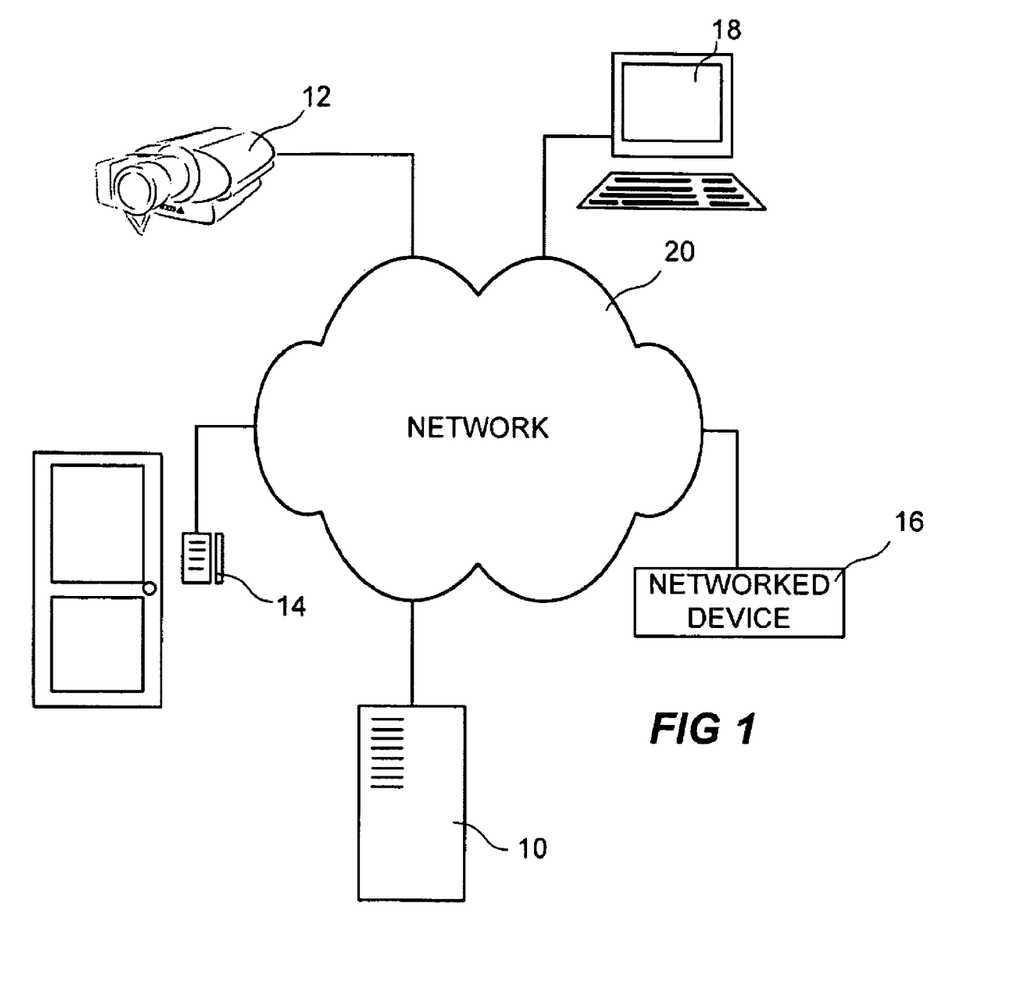
FIG. 1 is a schematic overview of a system according to one embodiment of the invention.

A system according to one embodiment of the invention is schematically depicted in FIG. 1. The system includes an access server 10 arranged to control and manage access privileges of the networked devices 12, 14, and 16. Further, the system includes a client 18, which may be used to access information in the access server 10 relating to access privileges of the system, and a network connecting the server 10, the networked devices 12, 14, and 16, and the client 18.

The access server 10 is a server that controls the access privileges of registered users to networked devices in the system. The networked devices 12, 14, and 16 may be any device connected to a network and arranged to be controlled or provide data via the network. The client 18 may be a computer enabling an administrator logging in to the server 10 and accessing information associated with the access privileges of registered access identities to functions of the networked devices 12, 14, and 16. According to one embodiment, access identities may be user identities and/or user group identities.

The networked devices 12, 14, and 16 may, as stated above, be any device providing data over the network and/or being controllable via the network. For example a networked device may be a video camera 12 enabled to communicate via the network for delivering video to a video server and/or for receiving control signals, e.g., controlling any one of or any combination of pan, tilt, aperture, frame rate, image resolution, etc. Such a networked camera 12 may typically be operated for monitoring or surveillance purposes. Another example of a networked device is an entry control system 14 used for controlling access to closed facilities or areas. However, many other devices may be contemplated by the skilled person.

Figure 2:
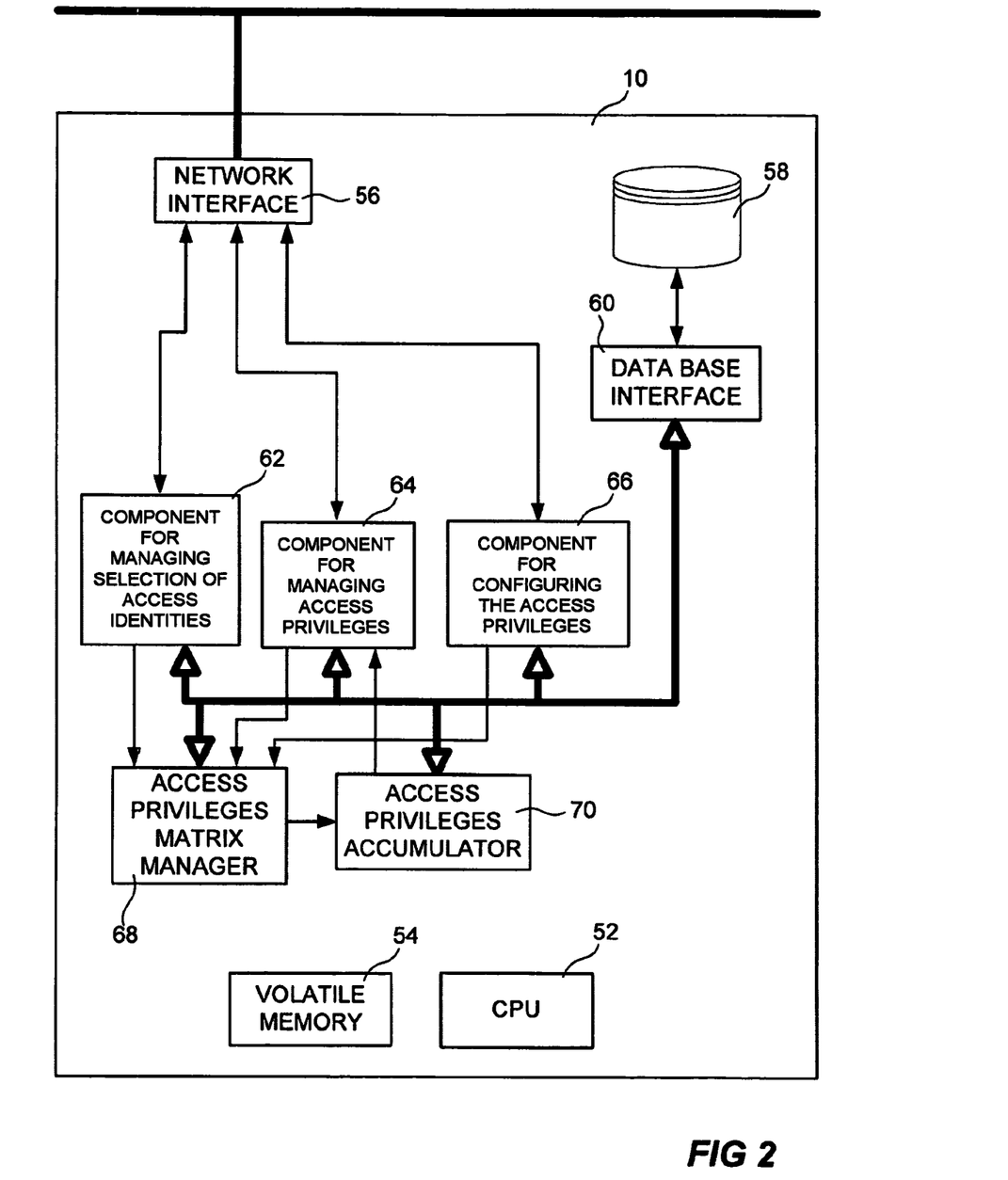
FIG. 2 is a block diagram of an access server according to one embodiment of the invention.

According to one embodiment of the invention, the access server 10 includes all components and functions of an ordinary server that is arranged to handle, send and receive data via a computer network. Hence, the access server 10 includes a CPU 52, Central Processing Unit, for processing of functions of an ordinary server as well as functions relating to the invention. Moreover, the access server includes a volatile memory 54 for temporary storage of data, information, instructions, etc., relating to the functions of an ordinary server as well as functions relating to the invention. The volatile memory 54 may for example be a RAM, Random Access Memory. Further, the access server includes a network interface 56 for enabling communication with other devices connected to the network, e.g., the networked devices. How to implement a network interface is known to the skilled person.

The access server 10 also includes a non-volatile memory 58, which may be a hard drive, a solid state drive, or any data storage device capable of storing data even when the power to the device is interrupted. In view of the invention, the non-volatile memory is arranged to store information of the access privileges of registered users to functions of the networked devices in the system. The storage capacity has to be adapted accordingly. In addition, the access server may include a data base interface 60 for managing the input and output of data to and from a data base. The data base may be arranged in the non-volatile memory 58, but may also be arranged at another storage point connected to the network.

In addition to all ordinary functions and in order to configure or reconfigure access privileges, the access server 10 may include a component for managing selection of access identities 62, a component for managing access privileges 64 and a component for configuring the access privileges 66.

The component for managing selection of access identities 62 is arranged to retrieve and send a list of access identities to a client computer for selection of access identities. The list of access identities may be retrieved from the data base including the access privileges associated with registered access identities, e.g., registered users and/or registered user groups, or it may be retrieved from a user management server associated to the network, i.e. a server that manages data required for authenticating logins to the network. Such a server may for instance, if the network system is a Microsoft based network, include the Active Directory.

The selection of access identities may be based on either one of those lists. The list associated to authenticated login on the network is advantageously used when new access identities, i.e., not registered for accessing the networked devices, are to be given access to the networked devices that require access privileges. The list of access identities registered for accessing the networked devices may advantageously be used in selecting access identities for which editing or changing the access privileges is to be performed. Moreover, in the context of the present application the term access identities, in view of selecting access identities for changing access privileges, may include user identities and/or user group identities. In the case of a user group being selected and registered, an identity of the user group is stored. The user group may be arranged to include user identifiers of the users associated with the user group; this enables retrieval of the users included in the user group when needed. This makes it possible to select user groups and single users for one management operation on the access privileges and then, if the users of the user group changes, the access privileges of the user group remains, but the access privileges of a user leaving or being added to the user group changes.

Figure 3:
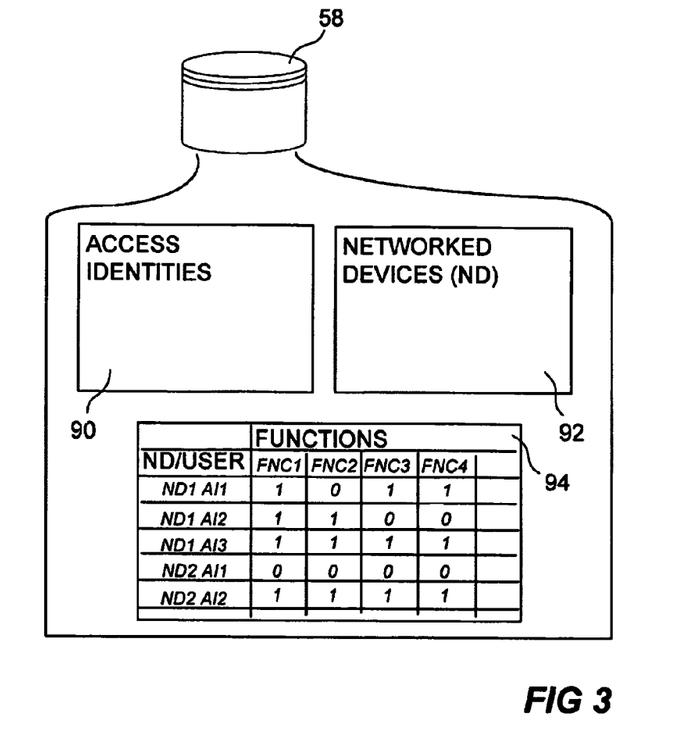
FIG. 3 illustrates data relating to the invention and stored in a data base of the access server in accordance with one embodiment of the invention.

The list 90 of access identities, see FIG. 3, is stored in the data base of the access server, or the data base associated to the access server according to one embodiment is shown. In addition to said list 90 of access identities registered for accessing the networked devices, the data base of the access server stores a list 92 of the networked devices and accessible functions of the devices and a list 94 in which an access privilege is associated to each function of each device and for each access identities. The list 94 may be stored as a list or a matrix, however, in order to facilitate the description of the information contained in the list, we will describe it as a matrix, hereinafter the list 94 will be referred to as the access privileges matrix 94. Thus, the access privileges matrix 94 is a combination of the list of registered access identities 90, the list of networked devices 92, and the access privileges of these access identities in relation to the functions of the networked devices. One way of describing an embodiment of such an access privileges matrix 94, see the example in FIG. 3, is to make every line represent a networked device and access identity combination, e.g., line 1 of the matrix represents network device 1 and access identity 1, line 2 represents network device 1 and access identity 2, line 3 represents network device 1 and access identity 3, line 4 represents network device 2 and access identity 1, line 5 represents network device 2 and access identity 2, etc., and make each column represent a function of the devices.

Now returning to FIG. 2, the component for managing selecting of access identities 62 is arranged to receive an indication of selected access identities from the client. An access privileges matrix manager 68 is arranged to add the selected access identities if the selected access identities are access identities that are not registered in the access privileges matrix. Further, the access privileges matrix manager 68 may be arranged to send the information from the access privileges matrix associated with the selected access identities to an access privileges accumulator 70.

Figure 4:
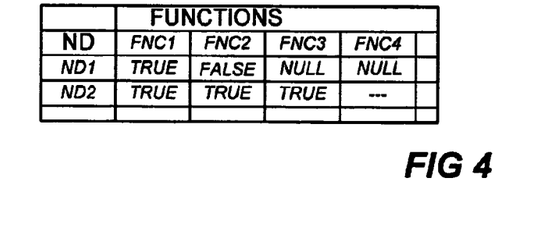
FIG. 4 illustrates a matrix of accumulated access privileges according to one embodiment of the invention.

The access privileges accumulator 70 is arranged to accumulate the access privileges of the selected access identities in an information structure that is to be sent to the client computer in order to enable changes of access privileges to be performed the client computer. The access privileges accumulator 70 counts how many of the selected access identities that are registered as having access to each of the functions of each of the networked devices. If all of the selected access identities have access to a specific function of a networked device, an entry relating to this particular function in this particular device is made stating that all selected access identities have access. If none of the selected access identities have access to a specific function of a networked device, an entry relating to this particular function in this particular device is made stating that none of the selected access identities have access. A third indicator is used in this system. This third indicator is used if some, but not all, of the selected access identities have access to a specific function of a networked device and then an entry relating to this particular function in this particular device is made stating that some of the selected access identities have access. Hence, the accumulated list or matrix identifies by component of three states the accumulated access privileges of the selected access identities to each function of each network device. An example of a part of an accumulated matrix is shown in FIG. 4. Said three states may be referred to or indicated in the data transmission by an "all access"-indicator, a "none access"-indicator, and a "some access"-indicator. In one embodiment, the "all access"-indicator is indicated as a TRUE value, the "none access"-indicator is indicated as a FALSE value, and the "some access"-indicator is indicated as a NULL indicator.

Figure 5:
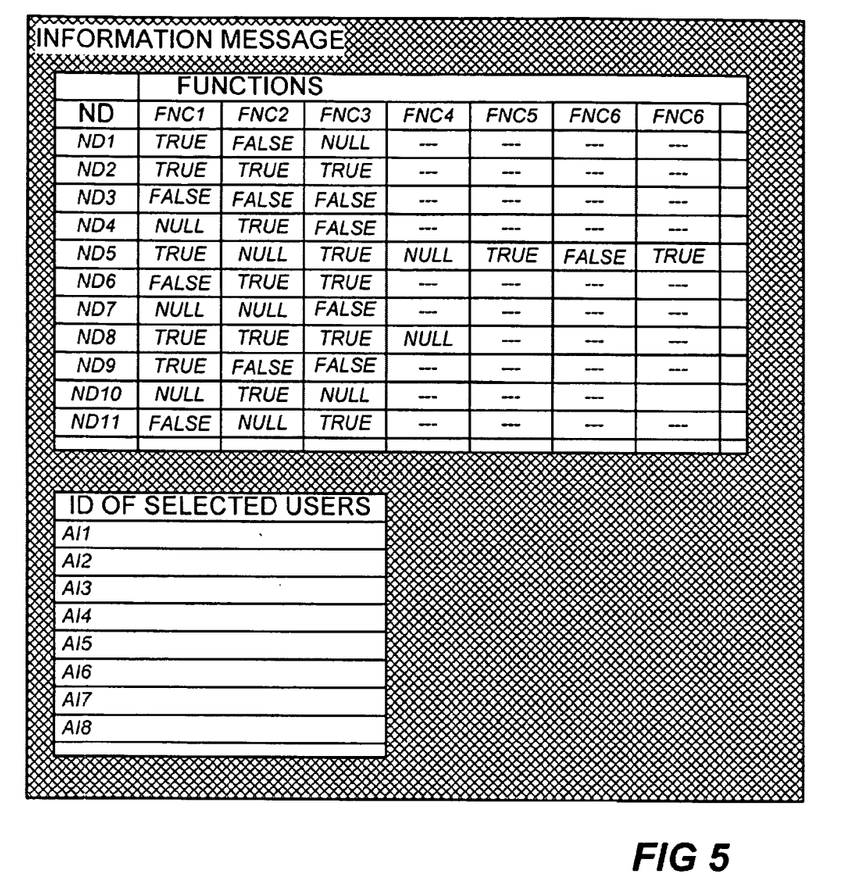
FIG. 5 illustrates an information message sent from the access server to the client according to one embodiment of the invention.

Returning to FIG. 2, the component for managing access privileges 64 is arranged to generate a message including information that enables a change of access privileges from the client. This information may be the accumulated access privileges and each associated function of each network device and a list of selected access identities, e.g. the accumulated matrix and a list of the selected access identities. One example of the content of such a message is shown in FIG. 5. The list of selected access identities may be represented in the message including the access privileges configuration information as a link or pointer to such a list stored in the server or any other network place. As a matter of fact, the list of the selected access identities is not necessarily present or even used in the client.

Figure 6:
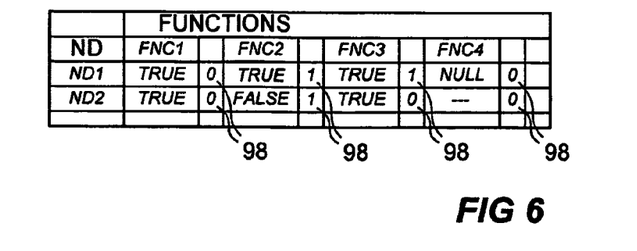
FIG. 6 illustrates a matrix of accumulated access privileges to be sent from the client to the server according to one embodiment of the invention.

Moreover, the component for configuring the access privileges 66 is arranged to receive a configuration request from the client. Said received request includes adjusted accumulated access privileges for each associated function of each network device and the list of selected access identities. If the list of access identities is not sent to the client as described above, the link or pointer sent from the access server to the client is returned. The component for configuring the access privileges 66 is also arranged to instruct the access privileges matrix manager 68 to set the access privileges in the access privileges matrix in accordance with the access privileges configuration request. In one embodiment, the received request additionally includes an indicator for each function of each device and which indicator indicates whether the access privileges of the function of the device has changed for the selected access identities in relation to the access privileges of the accumulated list sent from the access server 10. Dirty bits 98 may be used for indicators of changed access privileges as indicated in the example of a returned accumulated list showed in FIG. 6. In the example of FIG. 6, a dirty bit set to "1" indicates changed access privileges and a dirty bit set to "0" indicates no changes in access privileges. The position for dirty bits may also be present in the accumulated list sent from the access server to the client.

Figure 7:
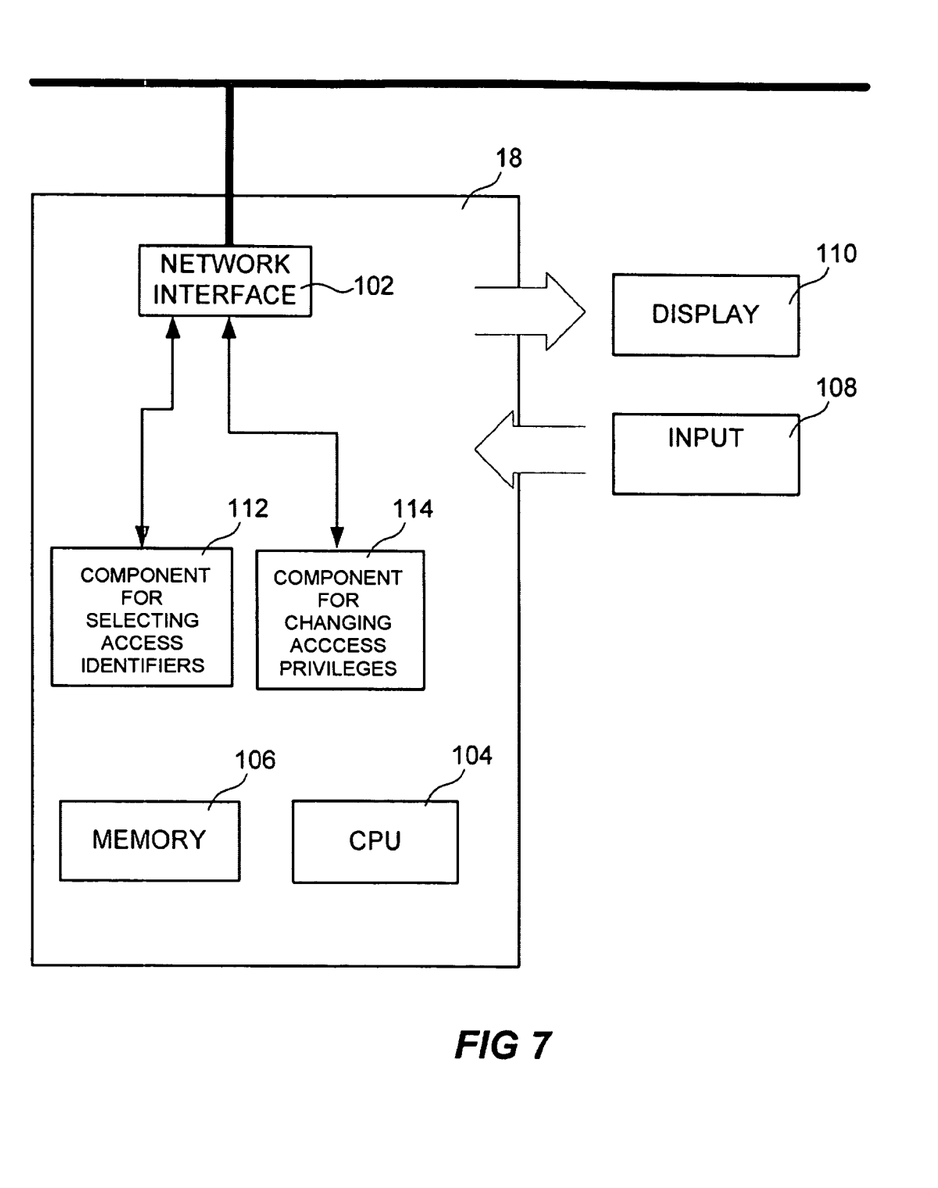
FIG. 7 is a block diagram of a client according to one embodiment of the invention.

In FIG. 7, there is shown a client that may be used in the invention. The client includes a network interface 102, a CPU 104, a memory 106, an input 108 and a display 110. The network interface 102 is arranged to enable communication with other devices connected to the network, e.g., the access server. How to implement a network interface is known to the skilled person. The CPU 104 is arranged to process the functions of the client and the memory is used for storage of information, e.g., temporary storage of executed instructions, etc. The client may be any general computer, such as a work station, a personal computer, a small handheld computer, a wireless telephone, a Personal Digital Assistant, etc., or it may be a specialized computer designed for being a client to the access server only.

The client includes component for selecting access identities 112 and component for changing access privileges 114. The component for selecting access identities 112 is arranged for accessing the access server and requesting the access server to provide information of the access identities of the system or the users of the network. From this information, the operator of the client may select said selected access identities and send back a list of selected access identities.

Figure 8:
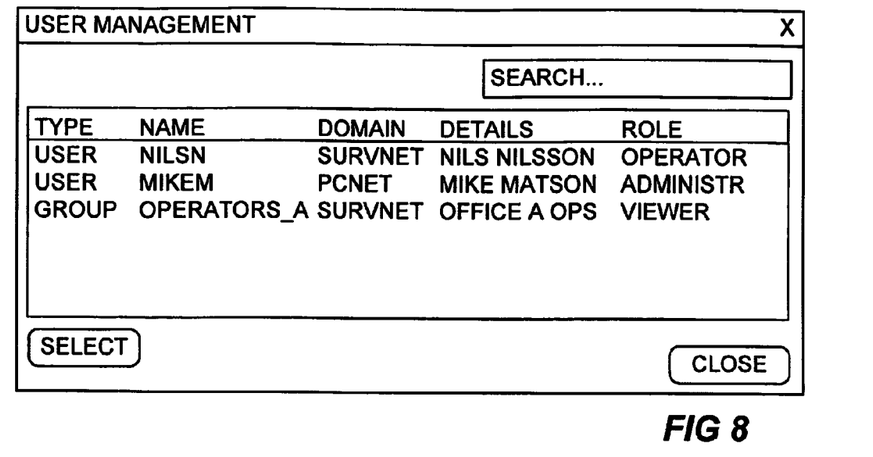
FIG. 8 illustrates a Graphical User Interface (GUI) for selecting users according to one embodiment of the invention.

In one embodiment, the component for selecting users 112 is arranged to display an interface in which the user of the client is able to choose between adding new access identities and changing access privileges for already registered access identities. Further, it is arranged to send an indication of which one of the choices the user of the client selected to the access server. Further, the component for selecting access identities 112 is arranged to receive a list of access identities and present the content of the list on the display 110 via an interface enabling selection of access identities from the list. One example of such an interface is showed in FIG. 8. The users may be marked by components of indicating each line presenting a access identities of interest and when the users of interest is marked, the select button is used to send the list of selected access identities to the access server.

Figure 9:
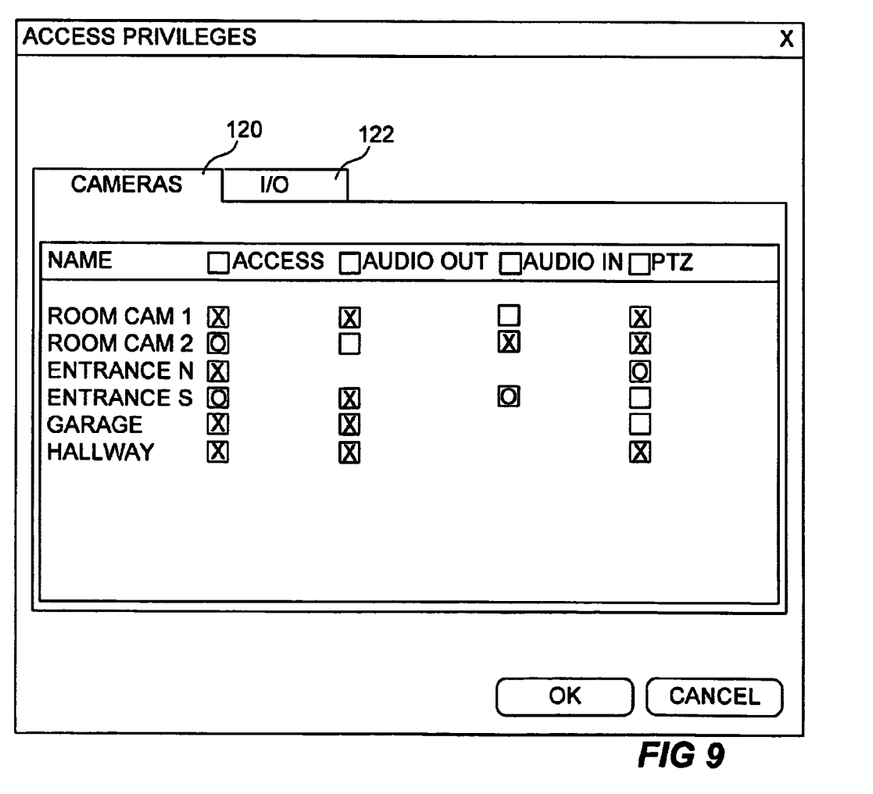
FIG. 9 illustrates a GUI for changing the access privileges of selected users to functions of networked devices according to one embodiment of the invention.

The component for changing access privileges 114 is arranged to receive an information message including information that enables a change of access privileges by the client. This information may be the accumulated access privileges and each associated function of each network device and a list of selected access identities, e.g., the accumulated list and a list of the selected access identities, as described in connection with the access server. An example of an information message is shown in FIG. 5. The component for changing access privileges 114 further includes means for presenting the information of the information message, such as an interface enabling the user of the client to change the access privileges. An example of such an interface for changing access privileges is shown in FIG. 9. In this particular embodiment of the interface, the networked devices, presented as cameras and I/O devices, are categorized and arranged under separate tabs 120, 122 of the interface. Each device is presented on a separate line, the functions are presented in columns, and the accumulated access privileges for each function of each device are presented at the intersection of the networked device and the function. An "x" indicates that all selected access identities have access, an empty box indicates that no selected access identities has access, and an "o" indicates that some access identities but not all have access. The interface is arranged to alternately change from "x" to empty and from empty, to "x", in response to the user selecting the box. In cases when the accumulated access privilege is indicated by "o", it may be changed to "x" or empty, but an empty or "x" may not be changed to "o". Hence, it is only possible to indicate whether all or none of the selected access identities are to have access. When the user of the client is finished with changing the access privileges, the OK button is to be selected. The component for changing access privileges 114 is arranged to change the accumulated list in accordance with the changes indicated in the interface and to indicate every changed access privilege, i.e., every changed access privilege to a function of a networked device, with an indicator indicating a change in access privileges 25 for all selected users in regard of the function of the networked device. This indication may be implemented as setting a dirty bit as discussed above in connection with the access server.

The component for changing access privileges 114 is also arranged to send the accumulated list as changed by the user of the client to the access server.

Figure 10:
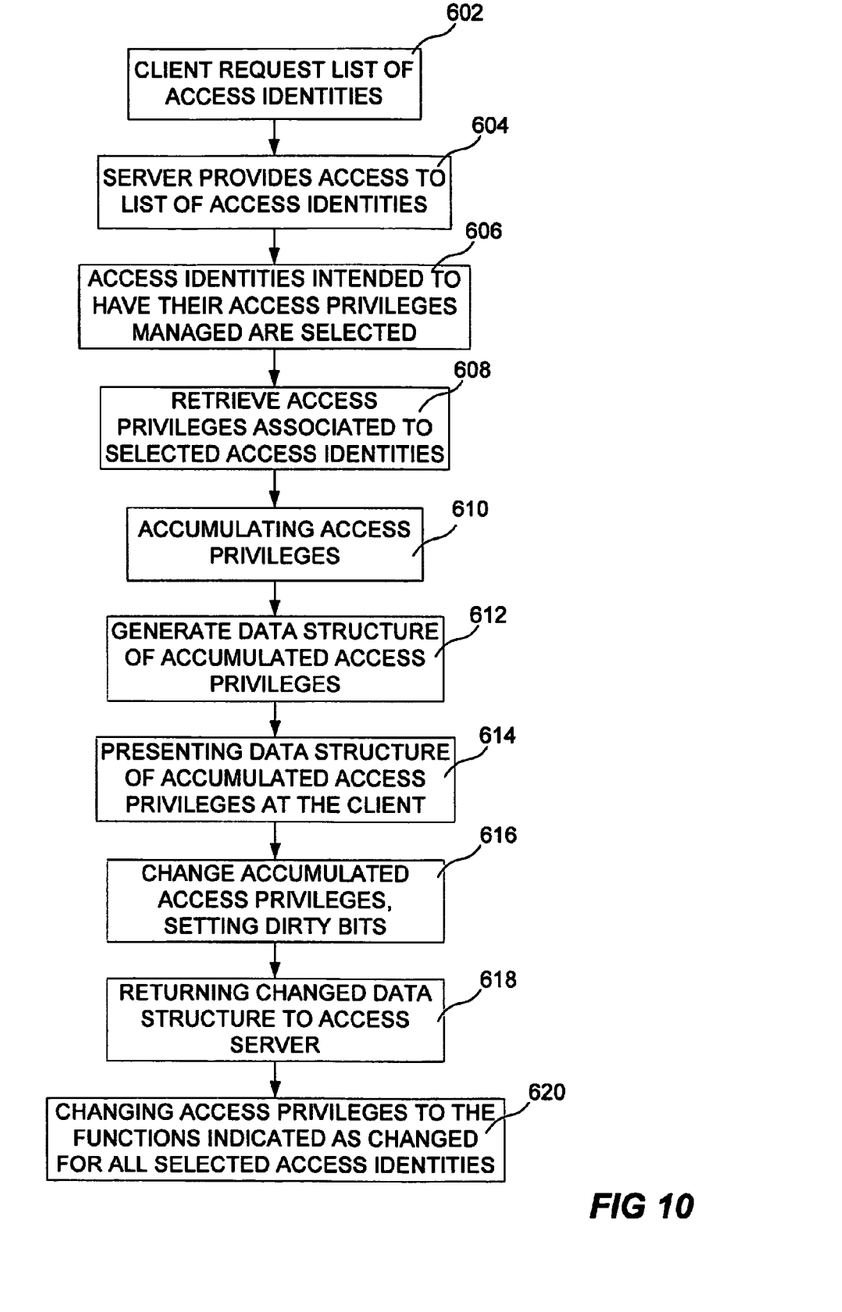
FIG. 10 is a flowchart illustrating a method for changing the access privileges associated with functions of networked devices.

According to another aspect of the invention, a method for configuring access privileges for functions of networked devices are implemented in the system, see FIG. 10. The system may be any authorization system enabling managing of access privileges. The system may be a system implementing 35 the discriminating implementation of only allowing users access devices which is registered as being allowed for the particular user to access. For example, the system may be an authorization module/system managing access to devices and/or functions of a security system, a surveillance system, a monitoring system etc., and in which systems different users are to have access to different devices and perhaps even different types of access to the devices to which they have access.

A user of a client computer (the method may be restricted to this user having administrator privileges for the network and the system or to this user having administrator privileges for the system only) initiates the configuring of access privileges for functions of networked devices in the system by operating the client to send a request for a list of access identities, step 602. In response to the request, the server provides access to a list of access identities registered for usage of the network and/or for usage of the system, step 604. At the client, the list of access identities is then presented, e.g., by using the interface described in connection with FIG. 8. The user operating the client then operates the client and selects access identities having access privileges that are to be managed, step 606.

By means of the invention, it may be advantageous to select access identities that are to have a plurality of identical access privileges because the interface for managing the access privileges is arranged to process the selected access identities in identical ways. The selected access identities are then used in the access server to prepare an accumulated access privileges matrix for the selected access identities only. If the selected access identities are access identities not registered in the system, then the selected access identities have to be added to the registered access identities of the system. For example, the access identities may be registered for the network (e.g., authenticated), but not for the system (e.g., authorized for the system).

Hence, the access server retrieve the access privileges associated to the selected access identities, step 608, and then the number of access identities having access to each function of each of the devices are counted and accumulated, step 610. This may be performed by making the server count the number of selected access identities that have access to each function of each network device and generating accumulated access privileges by comparing the number of selected access identities having access to each function of each networked device with the number of selected access identities. The accumulated access privileges may represent either all selected access identities having access, none of the selected access identities having access, or some of the selected access identities having access. According to one embodiment, the accumulated access privilege all selected access identities having access is represented by a "TRUE" value, none of the selected access identities having access is represented by a "FALSE" value, and some of the selected access identities having access is represented by a "NULL" value.

From the resulting accumulated access privileges, the server generates a data structure, step 612, including a plurality of data entries, each representing a networked device, a function associated with the networked device, and the accumulated access privileges for this particular function of this particular device in relation to the selected access identities. The data structure includes one of those data structures for each function of each networked device. The generated data structure is then sent to the client together with the list of selected access identities. In one embodiment the list of selected access identities sent to the client is replaced by a link or a pointer to the list and then the list may be stored at the server.

When the data structure of accumulated access privileges associated with functions and networked devices is received at the client, an interface of the client presents, step 614, the information on the display connected to the client.

According to one embodiment, the information of the data structure of accumulated access privileges is presented in an interface for presentation and changing of access privileges, e.g., in an interface as the one described in connection with FIG. 9. The operator of the client is then enabled to change the accumulated access privileges via the interface by simply selecting a specific access privilege which upon each selection alternates between all selected access identities getting access and none of the selected access identities getting access.

Each change of access privileges is stored in the data structure and may be indicated with an indicator, e.g. a dirty bit. At the moment the operator at the client decides that the changing of access privileges relating to the selected access identities are finished for this time, the client is instructed to return the changed data structure to the access server together with the list of selected access identities and the data structure of accumulated access privileges are returned to the access server, step 618.

Upon receipt of the changed data structure, the server searches for an indicator indicating a changed access privilege and reconfigures the particular function of the particular networked device associated to this indicator for all selected users of the list of selected access identities, step 620. The search and configuration is repeated until all entries being indicated as changed have been found. Then the new configuration of the access privileges of the system is running.

The step 602 of FIG. 10 in which a user operates the client to send a request for a list of access identities may result in one of two different retrievals of access identities or authenticated users. The user operating the client may decide to add further access identities to the system and in such a case the access server retrieves the list of users or user groups from a server managing the access and authentication of the network. The selected users will then become registered in the register of the system as well. On the other hand, the user operating the client may decide to change the access privileges of access identities already having accessing privileges in the system. Then the access server retrieves the list of access identities in the access server.

Figure 11:
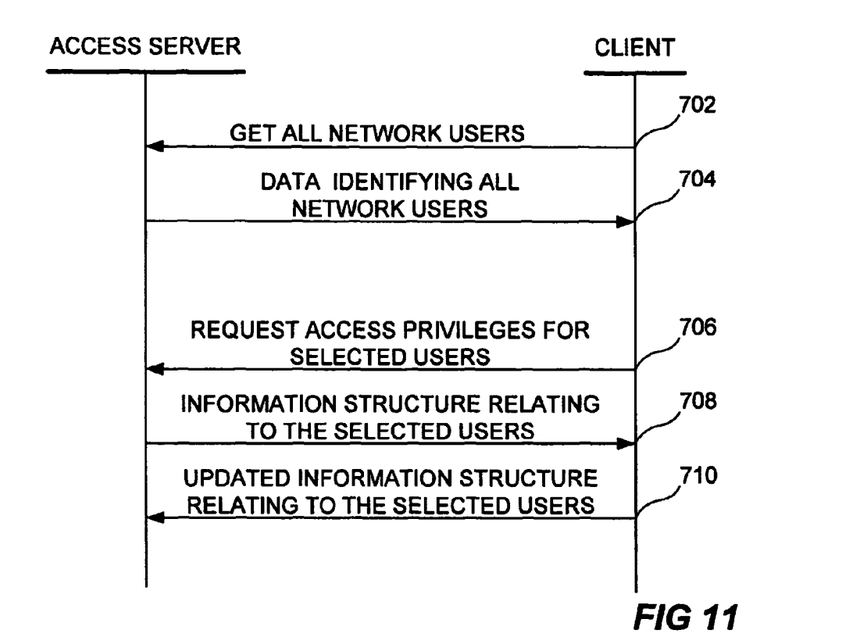
FIG. 11 is a diagram illustrating temporal relation between signals between the access server and the client according to one embodiment of the invention.

The signaling between the client and the server is described in FIG. 11. The example given in FIG. 11 relates to a situation where the user of the client intends to add new users to the system. Then the user indicates that he intends to add user or user groups and the client sends a request to the access server for a list of all network users, 702, from which a selection may be performed at the client. The access server contacts the network access and authentication server and retrieves user information and sends the data to the client, 704. At the client, a selection of users is performed and a request for amending/setting the access privileges of the selected users is sent, 706. In response to this request, the access server returns an information structure including accumulated access privileges of the selected users in view of each function of each networked device, 708. The data structure is amended at the client and the amended information structure is returned to the access server, 710. The amended information structure may include an indicator indicating the access privileges that has been amended.

Figure 12:
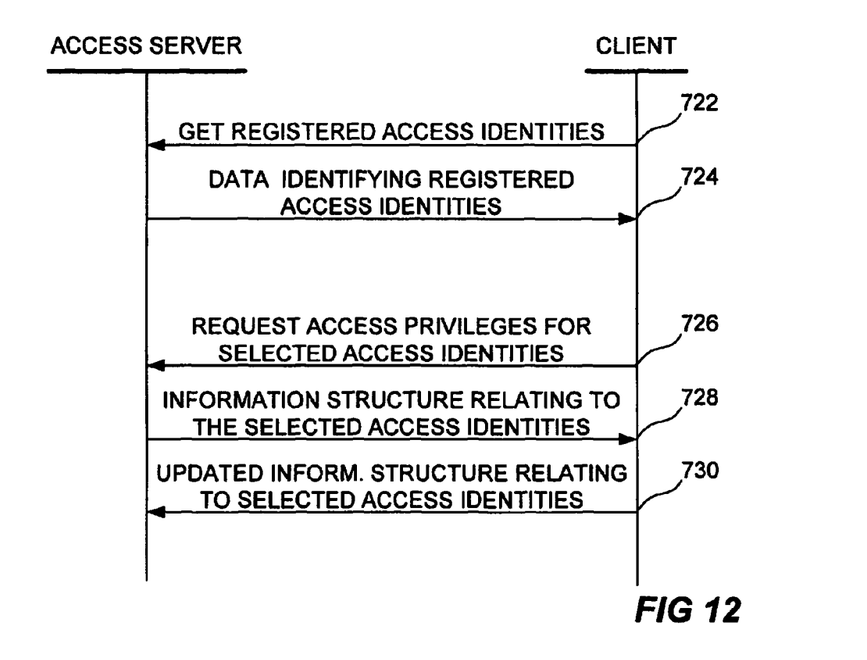
FIG. 12 is a diagram illustrating temporal relation between signals between the access server and the client according to one embodiment of the invention.

In FIG. 12, a signaling scheme similar to the scheme of FIG. 11 is shown. The example relates to a situation where the user intends to amend the access privileges of already registered access identities. Hence, the client sends a message requesting registered access identities, 722, and receives data identifying the registered access identities, 724. The user at the client then makes a selection from this data and performs the same signaling as in FIG. 11, i.e., signals 726-730 corresponds to signals 706-710 of FIG. 11.

What is claimed is:

1. A method for configuring access privileges in a system of networked devices, said method comprising:
   selecting a plurality of access identities;
   retrieving information of access privileges of each of the selected access identities to accessible functions of networked devices;
   determining accumulated access privileges of the selected access identities for each one of said accessible functions of each one of said networked devices, wherein said determining the accumulated access privileges includes counting the number of selected access identities having access privileges to each one of said accessible functions of each one of said networked devices and setting the accumulated access privileges for a specific function of a networked device to a value indicating whether the selected access identities are allowed access to the specific function if said counting indicates that the selected access identities are allowed access to the specific function;
   presenting said accumulated access privileges for each one of said accessible functions of each one of said networked devices in an interface allowing editing of the accumulated access privileges;
   indicating a change in accumulated access privileges to a specific function in a specific networked device; and configuring the specific function of the specific networked device for allowing access by the selected access identities in accordance with the indicated change of accumulated access privileges.

2. The method according to claim 1, wherein said determining the accumulated access privileges further includes:
setting the accumulated access privilege for a specific function of a networked device to a value indicating that all selected access identities are allowed access to the specific function if said counting indicates that all selected access identities are allowed access to the specific function;
setting the accumulated access privilege for a specific function of a networked device to a value indicating that none of the selected access identities are allowed access to the specific function if said counting indicates that none of the selected access identities are allowed access to the specific function; and
setting the accumulated access privilege for a specific function of a networked device to a value indicating that some of the selected access identities are allowed access to the function if said counting indicates that some of the selected access identities are allowed access to the function.

3. The method according to claim 1, further comprising sending, via a computer network information representing said accessible functions of said networked devices, information representing the accumulated access privilege associated with each one of said accessible functions, and information enabling identification of the selected access identities, to a client computer performing said presenting.

4. The method according to claim 3, wherein the information enabling identification of the selected access identities is a list including identifiers of the selected access identities.

5. The method according to claim 3, wherein the information enabling identification of the selected access identities is an identifier identifying the location of a list including identifiers of the selected access identities.

6. The method according to claim 3, further comprising returning, via the computer network information representing each one of said accessible functions of each one of said networked devices, an accumulated access privilege associated with each of these functions, and information enabling identification of the selected access identities, wherein the accumulated access privilege associated with at least one function of a networked device has been changed in relation to the corresponding information previously sent via the computer network.

7. The method according to claim 6, wherein the at least one function of a networked device for which the accumulated access privilege has been changed is tagged in order to indicate that the accumulated access privilege to this particular function has been changed in relation to the corresponding information previously sent via the computer network.

8. The method according to claim 1, wherein said indicating a change in accumulated access privileges to a specific function in a specific network device only enables changing an access privilege of a specific function of a specific network device to either allowing all users identified by the selected access identities to access the specific function or allowing none of the selected users to access the specific function.

9. The method according to claim 1, wherein the selecting of a plurality of access identities includes selecting a plurality of access identities from access identities registered for using the system.

10. The method according to claim 1, wherein the selecting of access identities includes selecting individual users.

11. The method according to claim 1, wherein the selecting of access identities includes selecting user groups.

12. A server for handling access privileges in a system of networked devices, the server comprising:
a component for managing selecting of access identities arranged to receive an indication of selected access identities from a client;
an access privileges manager arranged to retrieve information of access privileges of individually selected access identities to accessible functions associated with networked devices, and arranged to generate a message including accumulated access privileges in view of the selected access identities for said accessible functions of the networked devices;
an access privileges accumulator arranged to determine the accumulated access privileges of the selected access identities for said accessible functions of the networked devices from said retrieved information by counting the number of selected access identities having access privileges to each one of said accessible functions of the networked devices and set the accumulated access privileges for a specific function of a networked device to a value indicating whether the selected access identities are allowed access to the specific function if said counting indicates that the selected access identities are allowed access to the specific function; and
an access privileges device configurator arranged to configure the access privileges of accessible functions of networked devices for the selected access identities in accordance with a received message including an indicator indicating that the access privileges of said accessible function of the networked device is to be changed.

13. The server according to claim 12, wherein said access privileges accumulator is further arranged to:
set the accumulated access privilege for a specific function of a networked device to a value indicating that all selected access identities are allowed access to the specific function if said counting indicates that all selected users are allowed access to the specific function;
set the accumulated access privilege for a specific function of a networked device to a value indicating that none of the selected access identities are allowed access to the specific function if said counting indicates that none of the selected access identities are allowed access to the specific function; and
set the accumulated access privilege for a specific function of a networked device to a value indicating that some of the selected access identities are allowed access to the function if said counting indicates that some of the selected access identities are allowed access to the function.

14. The server according to claim 12, wherein the access privileges manager is arranged to include, in said generated message, information representing accessible functions of the networked devices, the accumulated access privilege associated with each included function, and information enabling identification of the selected access identities.

15. The server according to claim 12, wherein the system is a monitoring system.

16. The server according to claim 12, wherein the access identities include a user identity.

17. The server according to claim 12, wherein the access identities include a user group identity.

18. A client for changing access privileges to functions of networked devices of a system, said client comprising:
a display;
an input;

a component for selecting access identities, arranged for accessing an access server and for requesting the access server to provide information of the access identities of the system or the users of the network, and said component arranged to present access identities on the display and to allow a user of the client to select access identities by components of the input; and a component for changing access privileges for selected access identities to accessible functions of networked devices, said component for changing access privileges being arranged to present accumulated access privileges relating to said accessible functions of the networked devices on the display, to allow a user of the client to select and change the accumulated access privileges for presented accessible functions, and to generate a message including information of changed accumulated access privileges, wherein said determining the accumulated access privileges includes counting the number of selected access identities having access privileges to each one of said accessible functions of each one of said networked devices and setting the accumulated access privileges for a specific function of a networked device to a value indicating whether the selected access identities are allowed access to the specific function if said counting indicates that the selected access identities are allowed access to the specific function.

19. The client according to claim 18, wherein the component for changing access privileges is arranged to receive a message via a network interface, said message including information representing accessible functions of networked devices, information representing the accumulated access privileges associated with each of these functions, and information enabling identification of the selected access identities.

20. The client according to claim 18, wherein said generated message includes information representing accessible functions of networked devices, information representing the accumulated access privileges associated with each of these functions, an indicator indicating each accumulated access privileges that has been changed, and information enabling identification of the selected access identities.

21. The client according to claim 19, wherein the information enabling identification of the selected access identities is a list including identifiers of the selected access identities.

22. The client according to claim 19, wherein the information enabling identification of the selected access identities is an identifier identifying the location of a list including identifiers of the selected users.

\* \* \* \* \*